United States Patent [19]
Beltracchi

[11] Patent Number: 6,163,740
[45] Date of Patent: Dec. 19, 2000

[54] INTEGRATED ICONIC DISPLAY FOR POWER PLANTS BY DISPLAYING PLURALITY OF PROCESS ICONS CORRESPONDING TO ALL OPERATING HEAT ENGINES IN ONE SINGLE COMPUTER SCREEN

[76] Inventor: Leo Beltracchi, 12112 Triple Crown Rd., Gaithersburg, Md. 20878

[21] Appl. No.: 09/046,694

[22] Filed: Mar. 24, 1998

[51] Int. Cl.[7] .................................................. G06F 11/30
[52] U.S. Cl. ............................ 700/286; 700/17; 700/83; 700/96; 700/108; 700/117; 700/300
[58] Field of Search .............................. 700/95, 96, 108, 700/117, 286, 300, 17, 83

[56] References Cited

U.S. PATENT DOCUMENTS

| | | | |
|---|---|---|---|
| 4,478,783 | 10/1984 | Broadwater | 376/211 |
| 4,675,147 | 6/1987 | Schaefer et al. | 376/245 |
| 5,559,691 | 9/1996 | Monta et al. | 364/188 |
| 5,862,054 | 1/1999 | Li | 364/468.28 |
| 5,880,716 | 3/1999 | Kunugi | 345/173 |
| 5,918,233 | 6/1999 | La Chance et al. | 707/104 |
| 5,943,236 | 8/1999 | Ohno et al. | 364/468.15 |
| 5,956,665 | 9/1999 | Martinez et al. | 702/188 |

OTHER PUBLICATIONS

U.S. Statutory Invention Registration H289, Jun. 2, 1987.

*Primary Examiner*—Thomas C. Lee
*Assistant Examiner*—Thuan Du
*Attorney, Agent, or Firm*—Michael de Angeli

[57] ABSTRACT

An improved display for displaying in real time the temperature profile of the heat transfer medium in one or more implementations of heat engine cycles in a nuclear or fossil-fuel power plant. Clear and convenient graphic illustration of the principal operating parameters and key system status data pertaining to the power plant is provided by an Integrated Plant Iconic Display on a single computer screen. As many as four heat engine cycles are each represented by a "Process Icon", providing a graphical illustration of key measured and computed data, such that the Process Icon provides a real-time model of current operations. As each of the Process Icons appear on one display screen, their relative performance is readily observed by an operator viewing the single display on which they appear. A System Icon on the same screen shows the condition of the principal pumps and valves, and other components of the coolant systems.

21 Claims, 3 Drawing Sheets

//www.w3.org/1999/xlink
INTEGRATED ICONIC DISPLAY FOR POWER PLANTS BY DISPLAYING PLURALITY OF PROCESS ICONS CORRESPONDING TO ALL OPERATING HEAT ENGINES IN ONE SINGLE COMPUTER SCREEN

RESERVATION OF GOVERNMENT RIGHTS

The United States Government has a nonexclusive, irrevocable, royalty-free license in the invention hereof, with power to grant sublicenses for all governmental purposes.

FIELD OF THE INVENTION

This invention relates to improved monitoring and control of the operation of power plants, including both nuclear and fossil-fuel plants, by improved display of information concerning the plant's current operational status.

BACKGROUND OF THE INVENTION

The safe and efficient control of power plants requires that the plant operator(s) comprehend significant quantities of interdependent data items; more specifically, plant operators must be able to respond rapidly to a wide variety of possible changes in plant operating conditions by taking appropriate control actions. The present invention relates to improved displays for providing plant operators with more readily comprehensible information. The invention is applicable to monitoring and control of all types of nuclear power plants, including those comprising light water reactors, gas cooled reactors, and liquid metal cooled reactors, as well as fossil-fueled power plants. In order to allow complete explanation of the invention, a power plant comprising a pressurized water nuclear reactor is first discussed; use of the invention for monitoring and control of such a plant is then discussed in detail.

As is generally conventional, the power plant comprising a pressurized water reactor described herein consists of four closed reactor coolant loops ("primary coolant loops") connected in parallel to the reactor vessel to form the primary coolant system. A separate power conversion system ("secondary coolant system") converts heat energy received from the primary coolant system to electrical energy. Each primary coolant loop contains a reactor coolant pump, a steam generator, loop piping, instrumentation, and water serving as the reactor coolant. The instrumentation monitors process and system variables. One of the primary coolant loops contains an electrically heated pressurizer for the control of pressure within the primary coolant system.

Liquid phase water is pumped through the reactor core to remove heat generated by nuclear fission. The heated water flows via the primary coolant loop piping to the corresponding steam generator, where heat is transferred to the secondary water, cooling the primary water. The reactor coolant pump then pumps the cooled primary water into the reactor vessel, completing the primary cycle.

Liquid phase water in the secondary system is boiled to steam in the steam generators, as heat is transferred from the hot primary coolant water. Saturated steam exiting from the steam generators is directed to the high pressure steam turbine to perform work on the turbine. After exiting the high pressure turbine, the low energy, moisture laden steam is routed to a moisture separator/reheater where excess moisture is removed and the steam reheated. The reheated steam then enters the low pressure turbine, where it performs further work in driving the turbine. After exiting the low pressure turbine, the low energy moisture laden steam enters the condenser, where it is condensed to liquid phase water via heat transfer to a heat sink. The heat sink is the environment and usually consists of condenser cooling water from a lake, river, or ocean. In some cases, the heat sink may comprise a cooling tower.

The condensed secondary water then enters a hotwell; it is pumped from the hotwell to four parallel strings of feedwater systems, each string containing a hotwell pump, a booster pump, a feedwater pump, and feedwater heaters. Each of the four feedwater systems supplies a steam generator with heated feedwater to complete the secondary cycle. Instrumentation in the secondary system monitors process and system variables.

The overall plant is referred to as including four heat engines, and the overall process of power generation as the heat engine cycle, while the cycle undergone by the water in each secondary system is known as the Rankine cycle. For the pressurized water reactor power plant discussed, having four separate secondary water loops, four Rankine cycles are thus implemented in the overall secondary system, sharing a common turbine and condenser. The thermodynamic process in each cycle consists of heat transfer, heat transport, and work functions. Each of these functions are further described by one or more process variables, such as coolant temperature, pressure, and flow rate. The processes within the associated primary coolant loops also consist of heat transfer, heat transport, and work functions; these functions are also described by process variables such as coolant temperature, pressure, and flow rate. The heat source for the primary coolant is the reactor, and the heat sink for the entire plant is the environment. In summary, then, the heat engine cycles for the plant include four primary coolant loops and the processes therein, and the four associated secondary coolant loops and the processes therein, with the reactor as the heat source and the environment as the heat sink.

The integrity of the physical systems, consisting of the primary coolant system, the secondary coolant system, and the associated process controls, should be maintained and monitored to sustain efficient and safe operation of the plant. The failure of a critical system will impact the process and will initiate the operation of a safety system. Human operators are required to monitor instrumentation for system and process variables in order to determine the status of the plant.

Monitoring the power plant to ensure efficient and safe operation requires the operators to monitor and comprehend a large number of process and system variables and to evaluate a number of process and system functions. The process and system variables may consist of water flow rate, temperature, pressure, pump speed, and the positions of valves at a significant number of points in the power plant. A process function may consist of a heat transfer function, such as the heat transfer from the primary coolant in the steam generator to the secondary coolant in the steam generator. A system function may consist of a process control system regulating the flow of feedwater.

The integrity of the heat engine cycle must be monitored to ensure that the reactor is continually cooled and operated in a safe and efficient manner. For example, the detection of a hot bearing in a coolant pump will require operator action to compensate for the loss of the pump. The loss of a coolant pump will disturb the flow of heat energy through the heat engine cycle, possibly resulting in the approach of unsafe operating conditions, such as undue heating of the reactor.

The process parameters and functions that must be monitored for proper operation of a typical pressurized-water reactor nuclear power plant include the power generated by the reactor, the heating of the coolant water by the reactor, the heat transfer from the primary coolant water to the secondary water in the steam generator to produce steam, the work done by the steam in driving the high pressure turbine, reheat of the high pressure turbine exhaust steam before supply to the low pressure turbine, work performed by the steam in driving the low pressure turbine, condensation of the low pressure turbine exhaust steam in the condenser, and the recirculation of the condensed water to the steam generators through their respective feedwater systems.

Those of skill in the art recognize that this brief list represents a substantial simplification of the overall process variables, system variables, and functions to be monitored. Nonetheless, it will be apparent that effectively monitoring even this limited number of variables and functions over a typical shift is a difficult task, particularly when disturbances occur in the plant. Further, noting that typical plants contain as many as four sets of feedwater heaters and steam generators, it will be apparent that simplifying the operator's cognitive tasks and monitoring duties and rendering their performance as intuitive as possible would be highly desirable.

Monitoring of fossil-fueled power plants involves comprehension of a similar number of critical process and system variables, as well as numerous critical functions.

The most pertinent prior art disclosure known to the inventor as of the filing of this application is his United States Statutory Invention Registration H289 entitled Integrated Iconic Display. According to this disclosure, the principal process variables describing the thermodynamic process for one heat engine cycle, that is, the variables describing one primary coolant loop and the corresponding single secondary cooling loop, were shown by illustrating the temperature profile in the respective loops on a CRT display employing temperature and entropy as the coordinates of the display. Although this disclosure represented a useful and informative display, presentation of the thermodynamic process in this form required a great deal of display space. In particular, a display screen was needed for each heat engine cycle in the plant, and therefore separate screens were required to show process conditions in each heat engine comprised by the plant. Monitoring of a typical plant including up to four such heat engines by one person was very difficult, as the data to be monitored was not all displayed in one field of view. This made it difficult, for example, to compare the performance of the several heat engine cycles to one another and to detect differences in performance when they existed.

Alternative display arrangements for power plant monitoring shown in the prior art include a piping diagram of the coolant loops displayed on a screen with values for sensed process data displayed therein; such displays tended to intermix process data, such as temperature and pressure, with system data, such as pump and valve status. The intermixing of process data and system data made it difficult for the user to gauge the process data separately from the system data; that is, the operators found it difficult to monitor the total performance of each heat engine cycle and to reason in real time on the operation of the plant during plant disturbances. More specifically, the lack of integrated process data for the entire plant made it difficult for operators to reason using the thermodynamic first principles upon which the plant was designed.

Also, prior art display arrangements have not used the same temperature grid to display all of the heat engine cycles of a given plant, nor provided convenient displays of the temperature trends for sensed temperatures and computed temperatures within the heat engine cycle.

OBJECTS OF THE INVENTION

It is therefore an object of the invention to provide an integrated display of the overall operation of a power plant, wherein the key process parameters corresponding to all operating heat engines as well as the heat source and all heat transfer functions are shown in a readily-comprehensible graphic form on a single display screen, whereby, for example, comparisons between the various heat engines can be made at a glance.

It is a further object of the invention to present a real-time model of plant operation based on sensed plant data of a multi-loop nuclear power plant's thermodynamic process while also illustrating the coolant piping system and major components on a single display screen, thereby enhancing the monitoring of the plant's operation by an operator, and allowing prediction and planning of future operation.

It is a further object of the invention to present a graphical model of plant operations under ideal circumstances for direct visual comparison to actual operating data, to enable very convenient identification of out-of-limit parameters.

Other objects of the invention will appear as the discussion below proceeds.

SUMMARY OF THE INVENTION

The present invention satisfies the above objects and needs of the art by provision of an improved display arrangement for clear and convenient graphic illustration of the principal operating parameters and key system status data pertaining to a power plant on a single computer screen. This display arrangement, termed an "Integrated Plant Iconic Display", provides clear graphic representations of the operation of as many as four heat engine cycles in a display format suitable for display on a single screen. Each heat engine cycle is represented by a "Process Icon", providing a graphical illustration of key measured and computed data, such that the Process Icon provides a real-time model of current operations. As each of the Process Icons appear on a single display screen, their relative performance is readily observed by an operator viewing the single display on which they appear.

The Integrated Plant Iconic Display of the invention also includes a "System Icon" on the same display screen as the Process Icons, graphically illustrating key components of each heat engine by presenting data on the piping system and related components in the plant, illustrating the operational status of key valves and pumps. Each of the piping systems and its components for each of the multiple heat engines is displayed identically, again allowing ready comparison of the status of the components of each of the heat engines.

Process data is thus illustrated by the Process Icons and system data by the System Icons; these items appear separately on the display screen, but in a related manner. For example, the piping system diagrams on which the system status is illustrated are shown immediately below the process icons illustrating the process data.

The overview of plant operation provided by the Integrated Plant Iconic Display helps users reason about plant operation by supporting reasoning from first principles, such as the thermodynamic laws of conservation of mass and energy. The mass inventories and mass sinks presented in the display screen aid the human user in this task. In a preferred embodiment, a Reference Process Icon representing an ideal heat engine cycle is provided, embodying the thermodynamic laws for the conservation of energy and mass, and serving as a display of the design parameters of system operation. Major deviations of the Process Icon from the Reference Process Icon can be readily observed by the user, such that abnormal conditions are detected readily, to be followed by investigation, analysis and control action as necessary. Smaller significant deviations from the values represented by the Reference Process Icon are monitored by the computer also driving the display according to the invention, and are displayed as operator messages and alarms as necessary. Correction of these deviations improves plant efficiency.

The first principles discussed above are the thermodynamic principles upon which the plant is designed. By integrating these same first principles in the Integrated Plant Iconic Display according to the invention, that is, by providing the Reference Process Icon, the "knowledge gap" between the designers of the plant and its human operators is reduced.

A major advantage of use of the Process Icon over the display of individual process data is its display of complex thermodynamic functions by a graphic pattern rather than as a list of numbers or as indications on a series of instruments. For example, the thermodynamic coupling of the primary and secondary coolant loops in the steam generator is readily seen as the difference between the average primary coolant temperature and the secondary water saturation temperature in the steam generator. That is, by organizing the key data in the form of an icon of the process according to the invention, the fact that humans are good at pattern recognition is turned to significant advantage, while the overall job of monitoring the plant becomes much less tedious and mind-stultifying, reducing operator error. Operators can be easily trained to differentiate between abnormal and normal patterns exhibited by the Process Icon, corresponding to various abnormal and normal states of plant operation. This training can be easily accomplished by employing the invention as a plant simulator, that is, by controlling the display of the invention to display Process Icons corresponding to common plant abnormalities. The result is an overall improvement in the safety and efficiency of plant operation.

BRIEF DESCRIPTION OF THE DRAWINGS

The invention will be better understood if reference is made to the accompanying drawings, in which.

DESCRIPTION OF THE PREFERRED EMBODIMENTS

As mentioned above, FIG. 1 shows the Integrated Plant Icon 10 which appears on a single computer screen according to the invention and includes four different process icons 12, labeled A–D, each corresponding to one of four heat engines provided for converting thermal energy provided by the reactor to electrical energy, and a system icon in the lower half of the screen. The process icons are detailed in FIG. 2 and the system icon in FIG. 3. More specifically, the four process icons each illustrate the thermodynamic characteristics of one of the plant's four heat engines, while the system icon represents a simplified schematic view of the piping of the coolant loops of the plant; the connections to the turbine and nuclear reactor are not shown in detail as to each of the four heat engines illustrated by the system icon.

Figure 1:
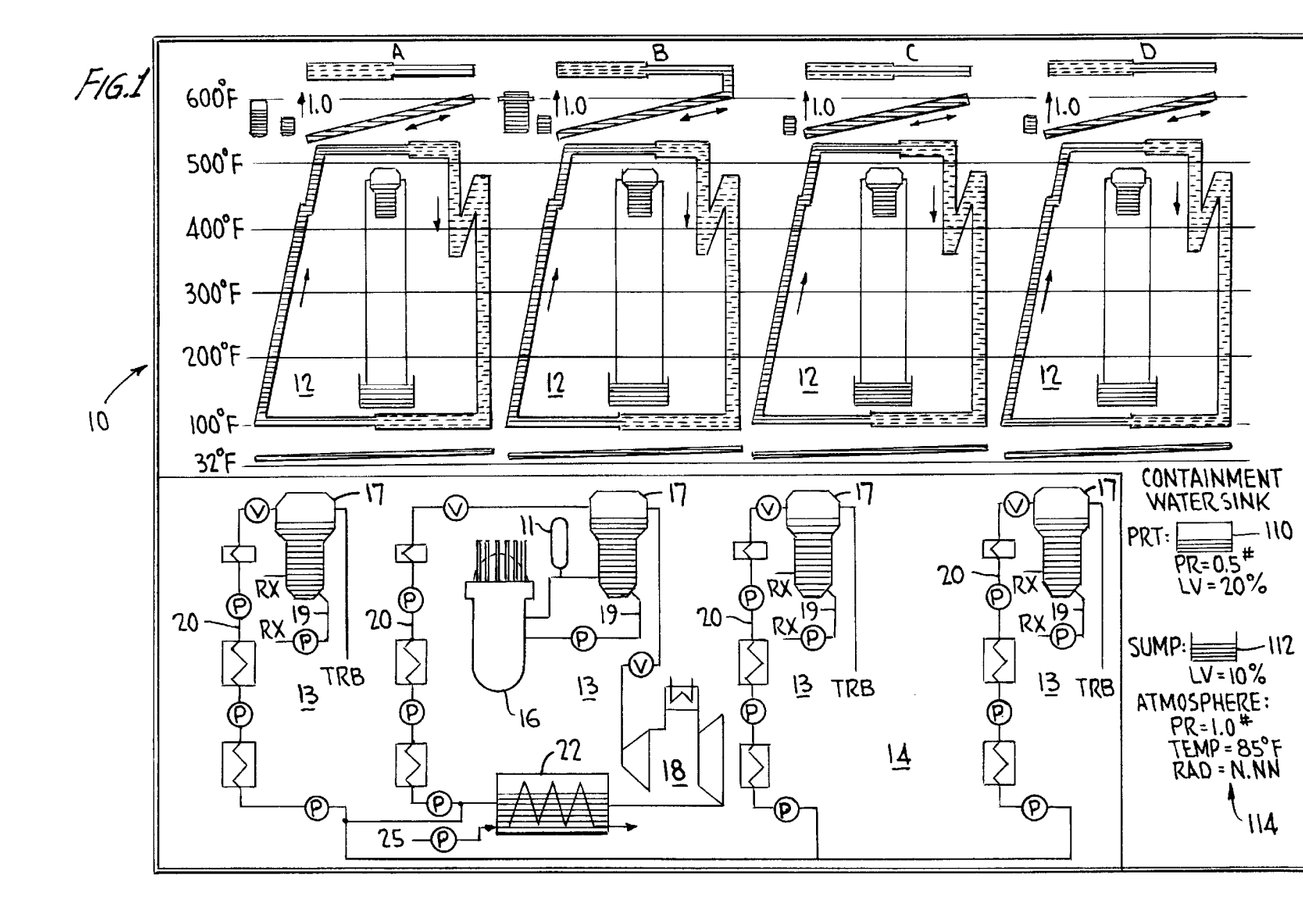
FIG. 1 shows the Integrated Plant Icon, including four Process Icons, and the System Icon.

From examination of FIG. 1, it will be appreciated that the user can visually compare the four process icons 12 and will be readily able to determine at a glance whether one departs substantially from the others due to some abnormality of operation. According to a further aspect of the invention discussed in detail below, a reference process icon can be overlaid over any of the process icons to enable direct visual comparison of the operating parameters of the corresponding heat engine as designed with respect to measured data, to enable a quick and convenient determination of whether a serious abnormality demanding further investigation is present. Deviations from the data making up the reference process icon may also be monitored by the computer independently and used to generate operator messages and alarms.

The system icon displayed in the lower portion of the integrated plant icon of FIG. 1 shows the nuclear reactor at 16 and the high- and low-pressure turbines at 18. According to the invention, and as will be explained in further detail below, the system icon 14 thus illustrates four primary cooling loops, each represented generally at 19, in which primary process water is circulated between the reactor 16 (abbreviated "RX" where the connections are not shown in full) and the four steam generators 17, in which heat energy is transferred to the secondary coolant water, and four secondary water loops 13, including feedwater sytems 20, implementing four complete Rankine cycles, wherein the secondary coolant water, now in the form of steam, is supplied to turbine 18 (abbreviated "TX") in order to generate electrical power. The system icon 14 displayed in the lower portion of the overall plant display of FIG. 1 thus illustrates the piping and components for four heat engines, each corresponding to one of the process icons 12. Also shown in abbreviated form by the system icon 14 are the pressurizer 11, which allows control of the pressure in the primary coolant system, and the condenser 22, wherein turbine exhaust steam from the secondary loops 20 is condensed to liquid phase water by heat exchange with water 25 from a river, lake, or the like, before being heated again.

Figure 2:
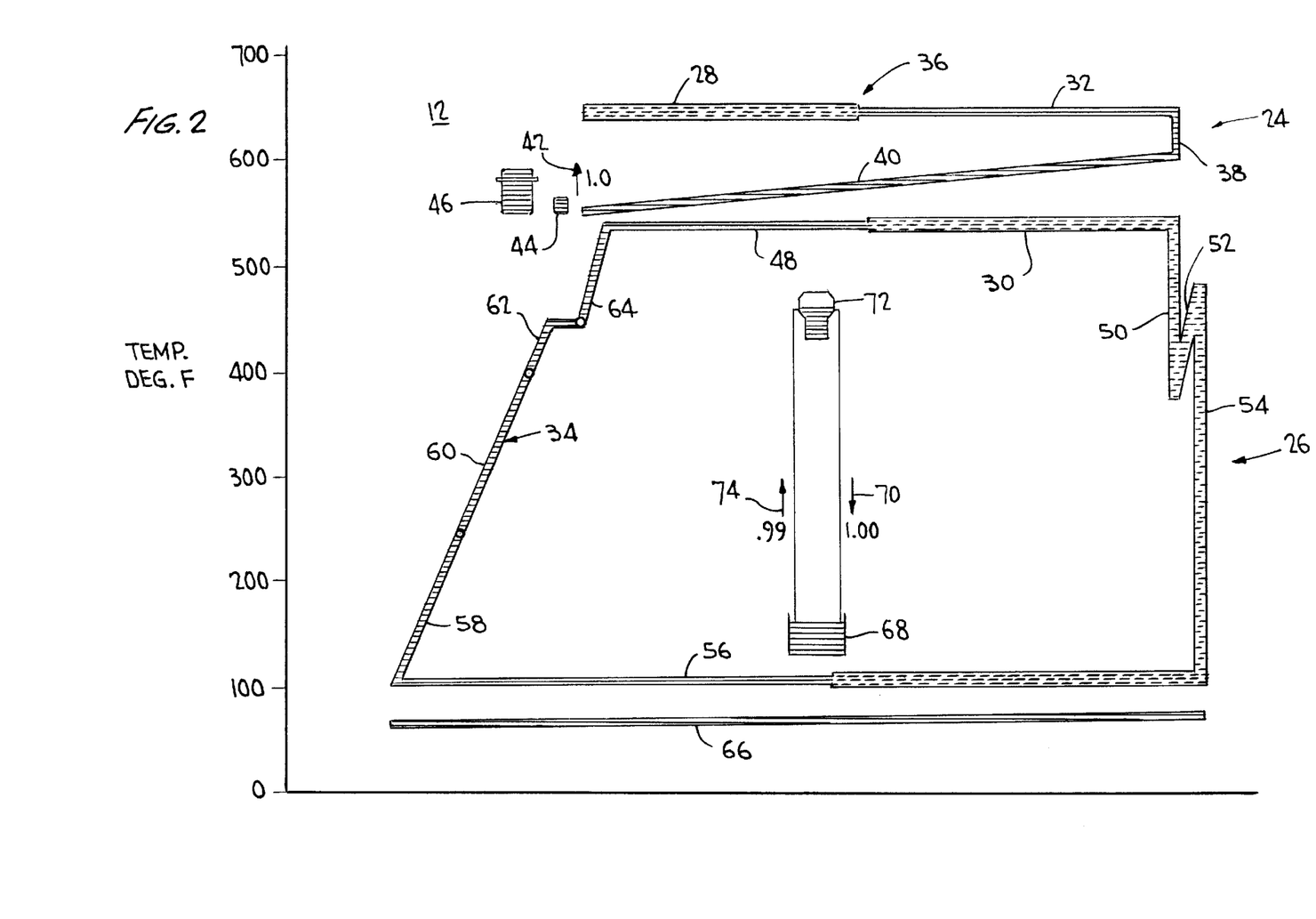
FIG. 2 shows an exemplary Process Icon.
Figure 3:
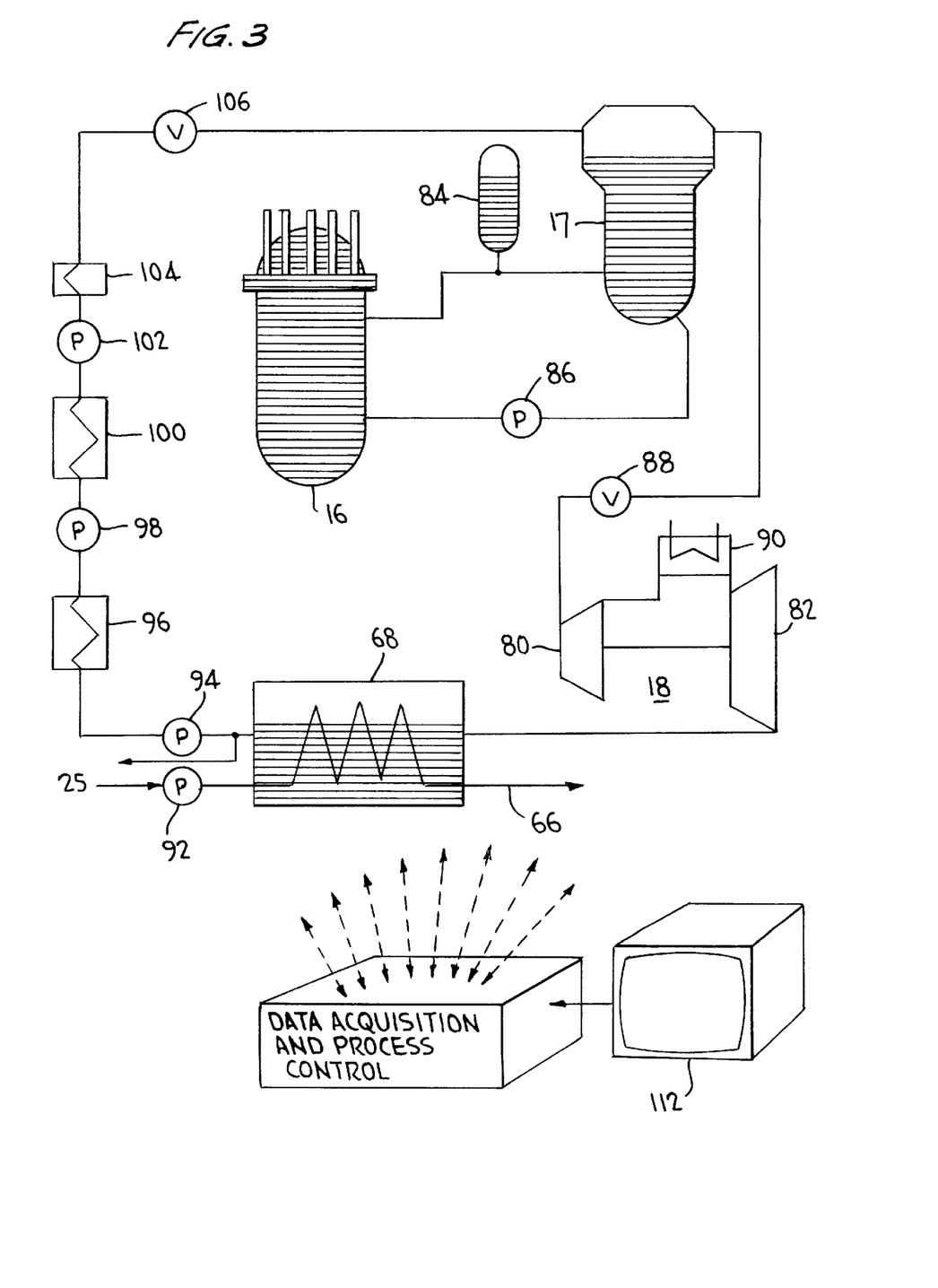
FIG. 3 shows a portion of the System Icon.

Further details of the displays provided by the process icons 12 and the system icons 14 will be apparent from review of FIGS. 2 and 3, respectively.

Referring now to FIG. 2, one process icon 12 is shown enlarged for clarity in explaining the display of each process icon as part of the overall integrated plant icon 10 of FIG. 1. The process icon shown enlarged in FIG. 2 corresponds to process icon B of FIG. 1, which includes the plant's single pressurizer; the other process icons do not. The process icon 12 consists of two major components, an upper primary coolant loop process icon 24 and a lower secondary loop process icon 26. In both cases, steam is represented onscreen in a different color than is water; preferably grey is used for steam and blue for water, but these choices are of course optional. In the black and white diagram of FIG. 2, the wider indicators, e.g., at 28, 30 represent steam, and the narrower lines, e.g., at 32, 34 represent water.

The vertical ordinate of the diagram in FIG. 2 is temperature in degrees Fahrenheit as labeled, while the horizontal scale is dimensionless and essentially represents different physical points within the system. Entropy, a property of water, is not used as a coordinate, as was done in the inventor's prior disclosure H289.

As mentioned, the upper primary coolant loop process icon 24 in the process icon 12 represents the temperature profile of water in the primary coolant loop. Water in this loop is heated by nuclear reaction. As this heat is transferred to water in the secondary coolant loops in the steam generators 17 (FIG. 1), the primary-loop water is accordingly cooled. This primary-loop water is recirculated and reheated repetitively. The inclined element 40 colored to represent water in process icon 24 represents the temperature rise of the coolant water across the reactor core, from 546° F. at the reactor core inlet to 600° F. at the core exit, as the reactor is the heat source for the cycle. Element 40 represents similarly the temperature drop of the primary coolant in the steam generator. Element 36, also in the upper primary coolant loop process icon 24, represents water and steam in the pressurizer 11, at the saturation temperature of 650° F.; in the preferred display, portion 28 is colored grey to represent steam and portion 32 blue to represent water.

As mentioned above, the process icon shown in detail in FIG. 2 corresponds to that of primary and secondary loops labeled B in the plant icon of FIG. 1. Only this primary loop includes a pressurizer 11 (FIG. 1); as is well-known to those of skill in the art, the pressurizer comprises readily-controlled electrical heating elements and cold water sprays used to control the pressure of water in all of the primary loops. Accordingly, only the process icon corresponding to primary loop B includes a vertical portion 38, representing water in the pipe connecting the pressurizer to the primary coolant system; this element is absent from process icons A, C, and D in FIG. 1. The schematic illustration of the pressurizer 11 is found only on the corresponding diagram in the system icon 14 of FIG. 1.

By comparison, element 36 is present in each of the four primary loop icons, and represents the saturation temperature of water in the corresponding primary loop. The vertical distance between elements 36 and 40 is a measure of the subcooling of the water in the primary coolant loop exclusive of the pressurizer; safe operation of the reactor is dependent on continued flow of the subcooled water. As noted, in the preferred display according to the invention, a first part 28 of the element 36 is shown grey to represent steam in the pressurizer and the remaining part 32 in blue, representing liquid-phase water in the pressurizer.

An arrow 42 represents the coolant flow in the primary coolant loop. The length of the arrow is normalized to design conditions and shown with a numerical value of 1.00 representing design flow.

Item 44 represents a full accumulator for the coolant loop, that is, if this element is not shown or is shown in an unusual way, the operator is alerted that the accumulator (part of the reactor's protective system) is not full. Similarly, item 46 represents the reactor, and is shown full of water. By depicting the water levels throughout the plant, the integrated plant icon of provides valuable water inventory information.

Turning now to the individual Rankine cycle of the secondary water loop represented by icon 26, horizontal line 48 as shown illustrates the transition from water to steam, when the water (pressurized to 963 psig) boils at 540° F. in the steam generator (by comparison, the pressurizer is pressurized to 2200 psig, so that water can be boiled at 650° F.). The thermodynamic coupling of the primary and secondary coolant loops in the steam generator is readily seen as the difference between the average primary coolant temperature and the secondary water saturation temperature in the steam generator.

Steam leaving the steam generator then performs work and is cooled as shown by element 50, which represents work done by the steam on the high pressure turbine. Steam leaving the high pressure turbine is then reheated at 52; it then performs further work, and is cooled further as indicated at 54, as work is done on the low pressure turbine. At element 56, the turbine exhaust steam is condensed back to water in the condenser, which occurs at 101° F. because the pressure is reduced to about 1 psi absolute by a vacuum pump. The secondary water is then collected in the hotwell; as the secondary water is pumped from the hotwell for reheating in several distinct stages before resupply to the steam generator, it is termed feedwater, as is well known to those of skill in the art. The reheating of the feedwater is illustrated along the left hand side of icon 26 and consists of a first stage 58 where the feedwater is pumped from the hotwell and heated to 250° F., followed by two stages of pumping through two stages 60, 62 of feedwater heating, using turbine bleed steam as the heat source, eventually reaching 450° F. The horizontal portion of element 62 represents flow of the feedwater into the steam generator. Element 64 represents the heating of the sub-cooled feedwater to saturation temperature in the steam generator.

Finally, also shown on process icon 12 is the temperature rise of the condenser cooling water from 60° F. to 65° F. as indicated at 66.

In a preferred embodiment, the process icon 12 also provides additional information, as follows. Icon 68 represents the condenser in the secondary coolant system. Arrow 70 represents turbine steam flow to the high pressure turbine normalized to design conditions, such that an arrow of unit size represents design operating flow. Symbol 72 represents the steam generator in the heat cycle, and arrow 74 represents the feedwater flow into the steam geneator. A number is provided, indicating the feedwater flow normalized to its design value, here 0.99, indicating normal operating conditions. Again, sustained departure of either of arrows 70 or 74 from their normal values indicates that something is amiss.

As discussed above, FIG. 3 shows an enlarged view of a portion of the system icon 14, corresponding to the complete system and including heat engine B. More specifically, as shown in FIG. 1, the reactor 16 and turbine 18 are only shown once in the system icon 14; FIG. 3 shows effectively an enlarged view of that portion of FIG. 1. The steam generators 17 of all four heat engines are shown in the complete system icon 14, as illustrated on FIG. 1, with connections to the reactor being illustrated as RX and to the turbine as TRB. Those of skill in the art will recognize that piping connections similar to those illustrated with respect to heat engine B by FIG. 3 are also provided. Under operator control, the FIG. 1 display can be reconfigured to show the piping connections of any of the other heat engines A, C, or D.

Thus, the principal components of the primary coolant loop, secondary coolant loop, and condenser cooling water flowpath of heat engine B are shown in FIG. 3; the principal elements that are instrumented to provide process data to the operator are identified therein and discussed below. As above, the reactor 16 is the source of heat in the system. Turbine 18, comprising a high pressure turbine 80 and a low pressure turbine 82, drives an electrical generator (not shown) to convert heat generated by the reactor into electrical energy. Computer equipment for data collection and display generation according to the invention is indicated schematically at 110, 112; selection of sensors used for measuring process variables, and of control elements and the like used throughout the plant, and the interfacing of these components to computer 110 for controlling the display according to the invention responsive to the collected data and further data computed therefrom, are well-understood by those of skill in the art, and need not be detailed herein. The same computer equipment can also be used for conventional monitoring and control purposes. In particular, measured and computed data is stored by computer equipment 110, 112 for display at the operator's option, as discussed below; such archiving of data is generally conventional.

As noted, the reactor 16 is full of water during normal conditions. The display according to the invention illustrates the actual water level measured. In an accident, the reactor may not always be full of water, and the display will of course show the actual water level sensed. Element 84 is the pressurizer and illustrates the measured water level therein, as shown. Element 17 is the steam generator of the particular heat engine and the measured water level is displayed as shown. Element 86 is the primary coolant pump; its operational status is shown by its color on the display. In the preferred embodiment, this pump is shown red for normal operating status and green for non-operable conditions, as is conventional in the industry, but of course this can be varied within the scope of the invention. Other control elements are similarly shown in red to denote normal operating conditions and green for non-operating conditions.

Valve 88 is the turbine control valve, again shown in red to denote normal operation and green for all other status indicators.

As discussed generally above, saturated steam is supplied to the high pressure turbine 80, and flows therethrough to do work by driving a rotating electrical generator (not shown). The steam is reheated at 90 by further heat exchange with bleed steam from the steam generator (these connections being well understood by those of skill in the art) and the reheated steam is then supplied to the low pressure turbine 82 to do further work. The spent steam exiting the low pressure turbine 82 is then further cooled in condenser 68 by heat exchange with water 25 supplied from a river, lake, or the like, as indicated at 66; pump 92 forces the condenser cooling water through the condenser 68 and is similarly color coded on the display to indicate normal or abnormal operation.

Water in the condenser hotwell is motivated by hotwell pump 94, becoming feedwater; again, the color in which this pump is illustrated on the display is indicative of its operating condition. Feedwater leaves hotwell pump 94 and is heated in feedwater heater 96 by heat exchange with turbine bleed steam. Booster pump 98 forces the heated feedwater to flow next through feedwater heater 100 where the water is further heated, also by heat exchange with turbine bleed steam. The next pump in line is the main feedwater pump 102, further forcing feedwater through a final pre-heat heat exchanger 104, again using turbine bleed steam. Valve 106 controls the overall flow of feedwater to the steam generator 17.

It will thus be appreciated by those of skill in the art that the simplified system icon display illustrated by FIG. 3 is capable of conveniently displaying the operational status of the principal pumps and valves in the system, and that the water level indicators shown are also highly useful to readily indicate, by color coding, any abnormal operational conditions that may occur.

As shown in FIG. 1 and discussed above, the complete process icon of FIG. 2 and the system icon of FIG. 3 correspond to heat engine B, one of the four heat engines in the particular plant being modeled by the display of FIG. 1. At the operator's option, any of the other heat engines A, C, or D could similarly be the subject of the expanded display.

FIG. 1 also shows data on the containment system. The uppermost icon 110 denotes the status of the pressurizer relief tank; pressure therein is indicated numerically and water level therein indicated both graphically and numerically, as illustrated. Similarly, icon 112 represents the sump, the water level therein being represented both numerically and graphically as shown. Data concerning the containment atmosphere is provided numerically as indicated generally at 114. Data on radiation levels is indicated as RAD=N.NN; this general format can be modified to show radiation in other units as desired by the operator. Other data, such as the date and time and the like, may of course be provided as well.

According to a further important aspect of the invention, the display shown can be modified at the operator's option for any of several purposes. As will appear below, certain of these additional displays require the maintenance of historical information concerning instrument measurements of temperature and the like, so that trends can be displayed; of course, it is within the skill of the art to so archive recorded and calculated data.

As mentioned above, numerous alternatives are considered to be within the scope of the invention concerning the display itself, and various options are supported thereby, in particular, replacement of the English units shown with metric units, replacement of English-language messages and menu entries with equivalents in other languages, and the like. It should also be clearly understood that although the invention has been described in connection with monitoring of a nuclear power plant employing a pressurized water reactor, generally similar conditions and constraints relate to the proper monitoring of other types of nuclear power plants and of fossil fuel power plants, and therefore the invention is considered to be applicable thereto as well where not specifically limited by the following claims. In general, such alternative types of nuclear power plants employ different types of primary coolant systems, while all nuclear power plants as well as fossil-fuel power plants employ generally similar Rankine-cycle secondary coolant systems.

Therefore, the above discussion of the invention is to be considered exemplary only, and its scope is limited only by the following claims.

What is claimed is:

1. A system for providing an integrated plant iconic display of measured process parameters and system component status in a power plant comprising a pressurized water nuclear reactor as heat source and one or more means for generating electrical power, said plant comprising at least two separate coolant systems implementing heat engine cycles to use water and/or steam as a heat transfer medium to transfer heat from said source to means for generating electrical power, each coolant system comprising primary and secondary coolant loops, each secondary coolant loop comprising a separate feedwater system, said system comprising:

means for collecting data representative of process and system parameters to be displayed;

means for monitoring the status of system components;

computer means for integrating said data and information provided by said means for monitoring, and for providing an integrated plant iconic display responsive thereto, said integrated plant iconic display comprising:

<at least two process icons, the number of said process icons being equal to the number of separate coolant systems implementing the heat engine cycles comprised by said power plant, each process icon graphically displaying measured and/or computed data representative of the temperature of water and steam at a plurality of points within the corresponding groups of components implementing the heat engine cycle, and displaying the flow of water and/or steam through said groups of components; and a system icon comprising a display including representation of said heat source, said means for generating electrical power, and at least two sets of water and steam flow control components as duplicated in each of said at least two corresponding coolant systems implementing the heat engine cycles, and connections therebetween, said system icon providing indication of the status of said control components therein.

2. The system for providing an integrated plant iconic display of claim 1, wherein said means for generating electrical power comprises high- and low-pressure turbines, and wherein steam is reheated between supply to said high-pressure turbine and said low-pressure turbine, and wherein said process icons depict the rise in temperature of said steam during said reheating.

3. The system for providing an integrated plant iconic display of claim 1, wherein said process icons corresponding to each heat engine and said system icon further display the relative levels of water with vessels comprised by said power plant.

4. The system for providing an integrated plant iconic display of claim 1, further comprising iconic displays of the level of water within containment and sump vessels comprised by said power plant.

5. The system for providing an integrated plant iconic display of claim 1, further comprising means allowing an operator to cause information representative of design data concerning said plant to be displayed in juxtaposition to said measured and/or calculated data representative of plant operation.

6. The system for providing an integrated plant iconic display of claim 5, wherein said design data may be displayed in the form of a reference process icon displayed in juxtaposition to a process icon displayed responsive to said measured and/or calculated data representative of plant operation.

7. A method for providing an integrated plant iconic display of measured process parameters and system component status in a power plant comprising a pressurized water nuclear reactor as heat source and one or more means for generating electrical power, said plant implementing plural heat engine cycles to transfer heat from said source to said means for generating electrical power, wherein heat is transferred from said reactor to said means for generating electrical power by at least two primary and at least two secondary coolant loops, using water and/or steam as a heat transfer medium, said method comprising the steps of:

collecting and/or computing data representative of process parameters to be displayed;

monitoring the status of system components;

integrating said data and information provided by said means for monitoring, and providing an integrated system iconic display on a single display screen responsive thereto, said integrated system iconic display comprising:

a number of process icons equal to the number of heat engine cycles implemented by said power plant, said heat engine cycles being implemented by said at least two primary and at least two secondary coolant loops, each process icon graphically displaying measured and/or computed data representative of the temperature of water and steam at a plurality of points in the corresponding heat engine cycle, and displaying the flow of water through components implementing said heat engine cycle; and a system icon comprising a display including representation of said heat source, said means for generating electrical power, and a plurality of system components comprising said at least two primary and at least two secondary coolant loops implementing said heat engine cycle and connections therebetween, said system icon providing indication of the status of said system components therein.

8. The method for providing an integrated plant iconic display of claim 7, wherein said means for generating electrical power comprises high-pressure and low-pressure turbines, and wherein steam is reheated between supply to said high-pressure turbine and to said low-pressure turbine, and comprising the further step of depicting the rise in temperature of said steam during said reheating in each of said process icons.

9. The method for providing an integrated plant iconic display of claim 7, comprising the further step of displaying the relative levels of water in vessels comprised by said power plant in said process icons and/or in said system icon.

10. The method for providing an integrated plant iconic display of claim 7, further comprising the step of providing iconic displays of the level of water within containment sump vessels comprised by said power plant.

11. The method for providing an integrated plant iconic display of claim 7, comprising the further step of allowing an operator to cause information representative of design data concerning said plant to be displayed in juxtaposition to said measured and/or calculated data representative of plant operation.

12. The method for providing an integrated plant iconic display of claim 11, wherein said design data may be displayed in the form of a reference process icon displayed in juxtaposition to a process icon displayed responsive to said measured and/or calculated data representative of plant operation.

13. The method for providing an integrated plant iconic display of claim 7, comprising the further step of allowing an operator to cause information representative of past measured data to be displayed in graphical form.

14. The method for providing an integrated plant iconic display of claim 13, comprising the further step of allowing an operator to cause corresponding information for each of the heat engines of the plant to be simultaneously displayed, enabling ready comparison therebetween and ready inspection of recent plant history.

15. A system for providing an integrated plant iconic display of measured process parameters and system component status in a power plant comprising a heat source and one or more means for generating electrical power, said plant comprising one or more separate groups of components implementing heat engine cycles to use water and/or steam as a heat transfer medium to transfer heat from said source to means for generating electrical power, said system comprising:

means for collecting data representative of process and system parameters to be displayed;

means for monitoring the status of system components;

computer means for integrating said data and information provided by said means for monitoring, and for providing an integrated plant iconic display responsive thereto, said integrated plant iconic display comprising:

a number of process icons equal to the number of separate groups of components implementing the heat engine cycles comprised by said power plant, each process icon graphically displaying measured and/or computed data representative of the temperature of water and steam at a plurality of points within the corresponding groups of components implementing the heat engine cycle, and displaying the flow of water through said groups of components; and a system icon comprising a display including representation of said heat source, said means for generating electrical power, and a plurality of sets of water and steam flow control components as duplicated in each of said corresponding groups of components implementing the heat engine cycles, and connections therebetween, said system icon providing indication of the status of said system control components therein; and wherein said system further comprises means allowing an operator to cause information representative of design data concerning operation of said plant to be displayed in juxtaposition to said measured and/or calculated data representative of plant operation.

16. The system for providing an integrated plant iconic display of claim 15, wherein said design data may be displayed in the form of a reference process icon displayed in juxtaposition to a process icon displayed responsive to said measured and/or calculated data representative of plant operation.

17. The system for providing an integrated plant iconic display of claim 15, wherein said heat source is a nuclear reactor, heat is transferred from said reactor to said means for generating electrical power by primary and secondary coolant loops, each secondary coolant loop comprising a separate feedwater system and steam generator, and said process icons separately illustrate the temperature of water in each of said primary coolant loops and water and/or steam in each of said secondary coolant loops.

18. The system for providing an integrated plant iconic display of claim 15, wherein said means for generating electrical power comprises high- and low-pressure turbines, and wherein steam is reheated between supply to said high-pressure turbine and said low-pressure turbine, and wherein said process icons depict the rise in temperature of said steam during said reheating.

19. A method for providing an integrated plant iconic display of measured process parameters and system component status in a power plant comprising a heat source and one or more means for generating electrical power, said plant using water and/or steam as a heat transfer medium in implementing one or more heat engine cycles to transfer heat from said source to said means for generating electrical power, said method comprising the steps of:

collecting and/or computing data representative of process parameters to be displayed;

monitoring the status of system components;

integrating said data and information provided by said means for monitoring, and providing an integrated system iconic display on a single display screen responsive thereto, said integrated system iconic display comprising:

a number of process icons equal to the number of heat engine cycles implemented by said power plant, each process icon graphically displaying measured and/or computed data representative of the temperature of water and steam at a plurality of points in the corresponding heat engine cycle, and displaying the flow of water through components implementing said heat engine cycle; and a system icon comprising a display including representation of said heat source, said means for generating electrical power, and a plurality of system components as duplicated by each of said components implementing said heat engine cycle and connections therebetween, said system icon providing indication of the status of said system components therein; and wherein said method comprises the further step of allowing an operator to cause information representative of design data concerning operation of said plant to be displayed in juxtaposition to said measured and/or calculated data representative of plant operation.

20. The method for providing an integrated plant iconic display of claim 19, wherein said design data may be displayed in the form of a reference process icon displayed in juxtaposition to a process icon displayed responsive to said measured and/or calculated data representative of plant operation.

21. The method for providing an integrated plant iconic display of claim 19, comprising the further step of allowing an operator to cause information representative of past measured data to be displayed in graphical form.

* * * * *